United States Patent
Saravanan et al.

(10) Patent No.: US 12,207,583 B2
(45) Date of Patent: Jan. 28, 2025

(54) METHODS AND SYSTEMS FOR CONTROLLING POWER SUPPLY OF AGRICULTURAL IMPLEMENT(S) ATTACHED TO AN AGRICULTURAL VEHICLE

(71) Applicant: MAHINDRA & MAHINDRA LIMITED, Mahindra World (IN)

(72) Inventors: N Saravanan, Mahindra World (IN); Sundaram Pavithra, Mahindra World (IN); Partha Singha, Mahindra World (IN); A Sivakumar, Mahindra World (IN); Aravind Bharadwaj, Mahindra World (IN)

(73) Assignee: MAHINDRA & MAHINDRA LIMITED, Mahindra World (IN)

( * ) Notice: Subject to any disclaimer, the term of this patent is extended or adjusted under 35 U.S.C. 154(b) by 214 days.

(21) Appl. No.: 17/910,160

(22) PCT Filed: Jan. 4, 2021

(86) PCT No.: PCT/IN2021/050007
§ 371 (c)(1),
(2) Date: Sep. 8, 2022

(87) PCT Pub. No.: WO2021/181405
PCT Pub. Date: Sep. 16, 2021

(65) Prior Publication Data
US 2023/0141306 A1    May 11, 2023

(30) Foreign Application Priority Data
Mar. 11, 2020 (IN) .............................. 202041010452

(51) Int. Cl.
*A01B 71/00* (2006.01)
*A01B 63/02* (2006.01)

(52) U.S. Cl.
CPC .............. *A01B 71/00* (2013.01); *A01B 63/02* (2013.01)

(58) Field of Classification Search
CPC ................................ A01B 71/00; A01B 63/02
See application file for complete search history.

(56) References Cited

U.S. PATENT DOCUMENTS

2016/0088787 A1 * 3/2016 Connell ................. A01B 63/24
701/33.9

FOREIGN PATENT DOCUMENTS

WO    WO-2017190704 A1 * 11/2017 ............. A01C 11/02

* cited by examiner

*Primary Examiner* — Aaron L Troost
(74) *Attorney, Agent, or Firm* — Maschoff Brennan

(57) ABSTRACT

Methods and systems for controlling power supply of agricultural implement(s) attached to an agricultural vehicle. Embodiments herein disclose a control system for controlling power supply of the agricultural implement. The control system includes a control unit that is configured to power up at least one component of the control system on receiving at least one signal by at least one speed sensor based on a rotation of the agricultural implement. The generated at least one signal corresponds to an operative mode of the agricultural implement.

9 Claims, 8 Drawing Sheets

METHODS AND SYSTEMS FOR CONTROLLING POWER SUPPLY OF AGRICULTURAL IMPLEMENT(S) ATTACHED TO AN AGRICULTURAL VEHICLE

CROSS REFERENCE TO RELATED APPLICATION

This application is based on and derives the benefit of Indian application No. 202041010452 filed on 11 Mar. 2020, the contents of which are incorporated herein by reference.

TECHNICAL FIELD

Embodiments disclosed herein relate to agricultural vehicles, and more particularly to controlling power supply of at least one agricultural implement connected to an agricultural vehicle.

BACKGROUND

Agricultural implements (such as rotavators, sprayers, harrows, plows, planters, harvesters/reapers and so on) can be connected to an agricultural vehicle for performing agricultural related operations. The agricultural implement may include a control system for measuring parameters of the agricultural implement (such as speed, hours of usage, and so on) and providing warnings/alerts to an operator to operate the agricultural implement at an optimized speed based on the measured parameters.

In conventional approaches, the agricultural implement may be coupled to a battery that provides power supply to components of the control system to measure the various parameters of the agricultural implement. The battery derives the power supply from a power source present in the agricultural vehicle (for example, an ignited engine, a battery of the agricultural vehicle, an on-board battery, or the like). In order to derive the power supply from the agricultural vehicle, the battery coupled with the agricultural implement may be connected to the power source of the agricultural vehicle using a wire connection. In an example herein, the agricultural implement such as a rotavator connected to a tractor and the wire connection used to connect the battery coupled to the rotavator with the power source of the tractor is illustrated in FIG. 1. However, such a wire connection may be damaged while performing agricultural related operations due to various factors. For example, the wire connection may be damaged due to high rotating speed of a Power Take Off (PTO) shaft mounted on the agricultural vehicle (a device used to transfer the power supply from the agricultural vehicle to the agricultural implement). The wire connection may also be damaged due to stones during tillage process. The damage of the wire connection may lead to a failure in the control system.

In addition, due to the wire connection, terminal connections with the battery have to be disconnected, while disconnecting the agricultural implement from the agricultural vehicle, which further leads to requirement for water and dust protections for the battery.

OBJECTS

The principal object of embodiments herein is to disclose methods and systems for controlling power supply of at least one agricultural implement, wherein the agricultural implement is connected to an agricultural vehicle.

Another object of embodiments herein is to disclose methods and systems for implementing at least one stand-alone battery as a part of a control system of the at least one agricultural implement.

Another object of embodiments herein is to disclose methods and systems for powering up at least one component of the control system using the at least one battery based on a mode of the agricultural implement for saving energy of the at least one battery.

Another object of embodiments herein is to disclose methods and systems for powering up and powering off of at least one speed sensor of the control system of the agricultural implement for a pre-determined time during an idle mode of the agricultural implement.

Another object of embodiments herein is to disclose methods and systems for deciding to power up at least one component of the control system of the at least one agricultural implement based on at least one signal received from at least one speed sensor, wherein the at least one signal is generated by sensing a rotation of the agricultural implement that indicates an operative mode of the at least one agricultural implement.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, through out which like reference letters indicate corresponding parts in the various figures. The embodiments herein will be better understood from the following description with reference to the drawings, in which.

DETAILED DESCRIPTION

Figure 1:
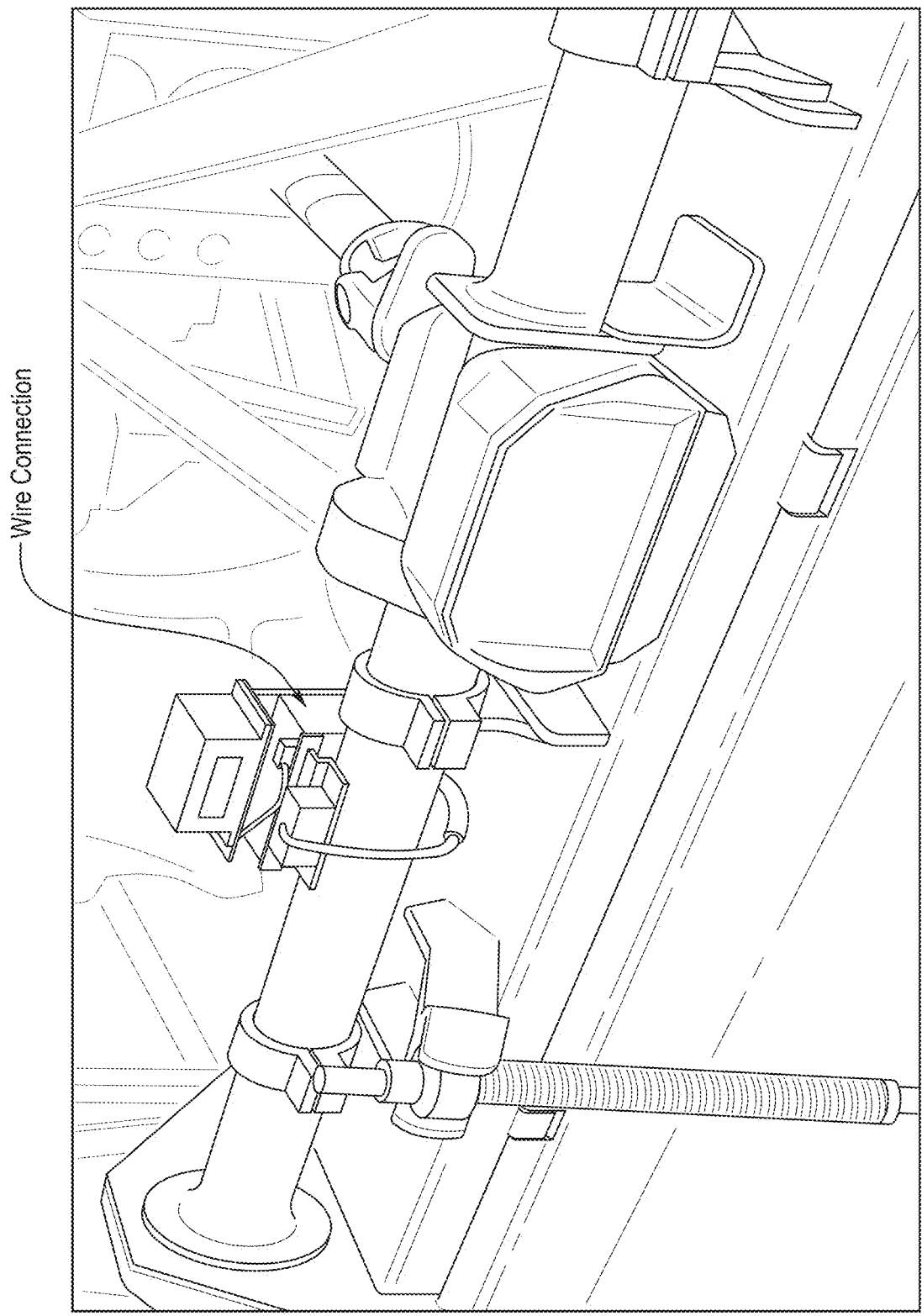
FIG. 1 depicts a wire connection used to connect a battery of an agricultural implement with a power source of an agricultural vehicle.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and system for controlling power supply of at least one agricultural implement connected to an agricultural vehicle.

Embodiments herein disclose methods and systems for implementing at least one standalone battery as a part of a control system of the at least one agricultural implement.

Embodiments herein disclose methods and systems for powering up at least one component of the control system using the at least one battery based on a mode of the agricultural implement for saving energy of the at least one battery.

Referring now to the drawings, and more particularly to FIGS. 2a through 6, where similar reference characters denote corresponding features consistently throughout the figures, there are shown embodiments.

Figure 2A:
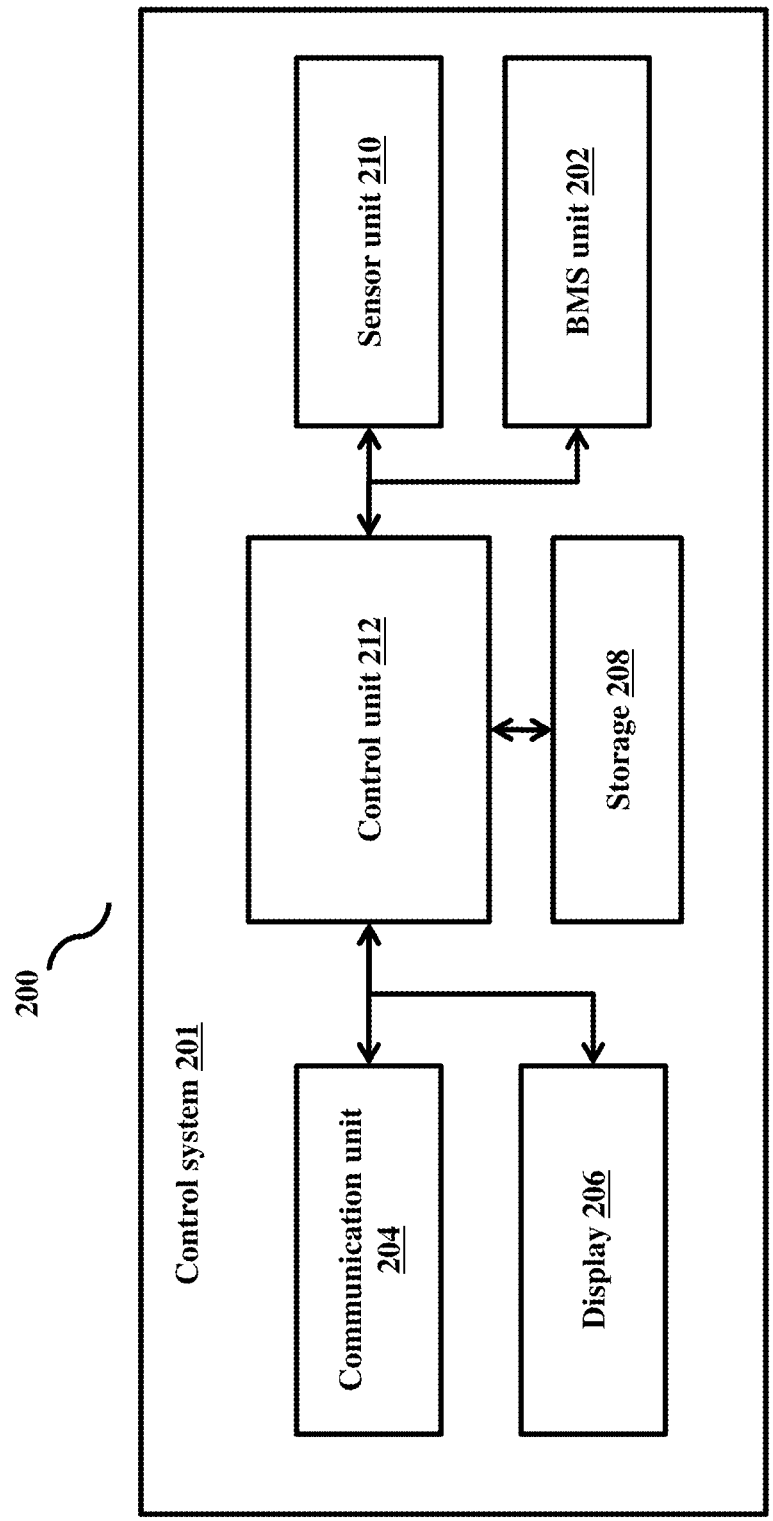
FIGS. 2a-2c depict a control system for controlling power supply of agricultural implement(s) attached to an agricultural vehicle, according to embodiments as disclosed herein.
Figure 2B:
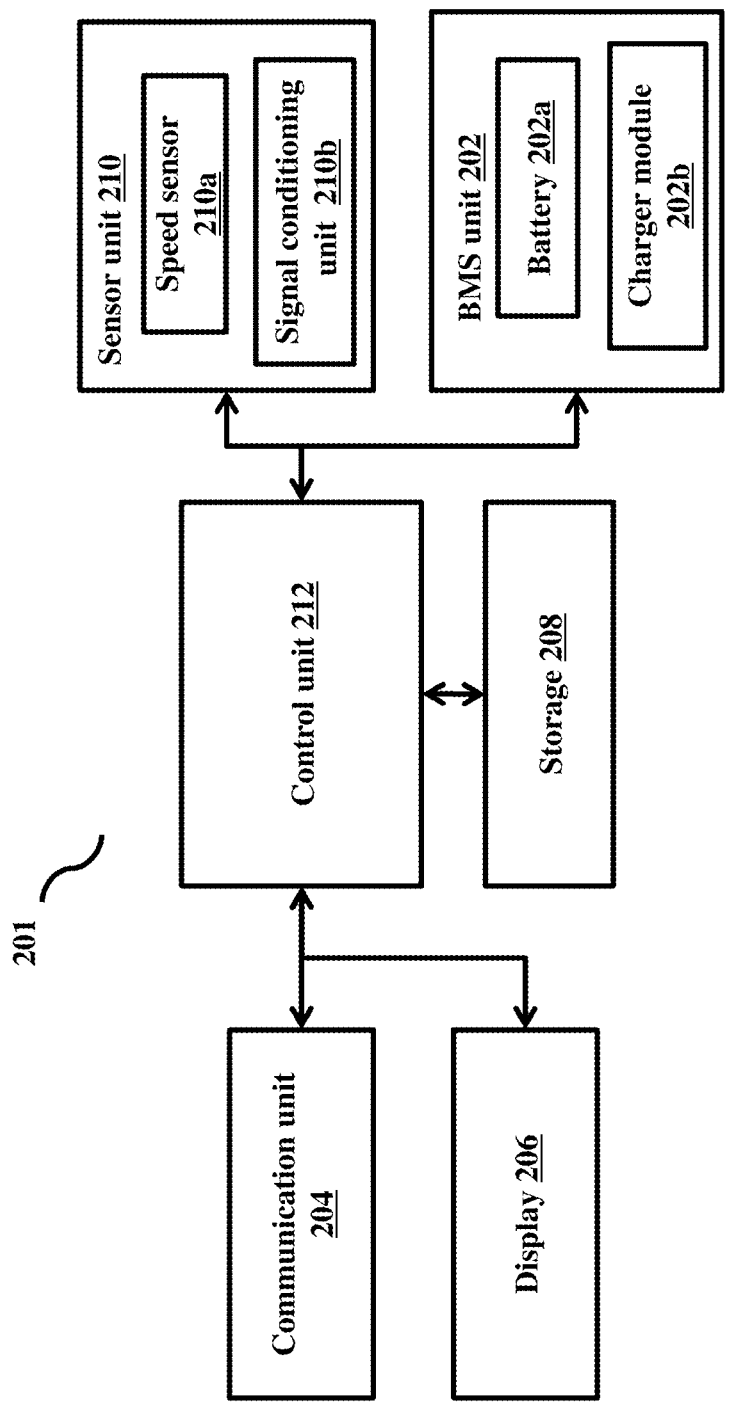
Figure 2C:
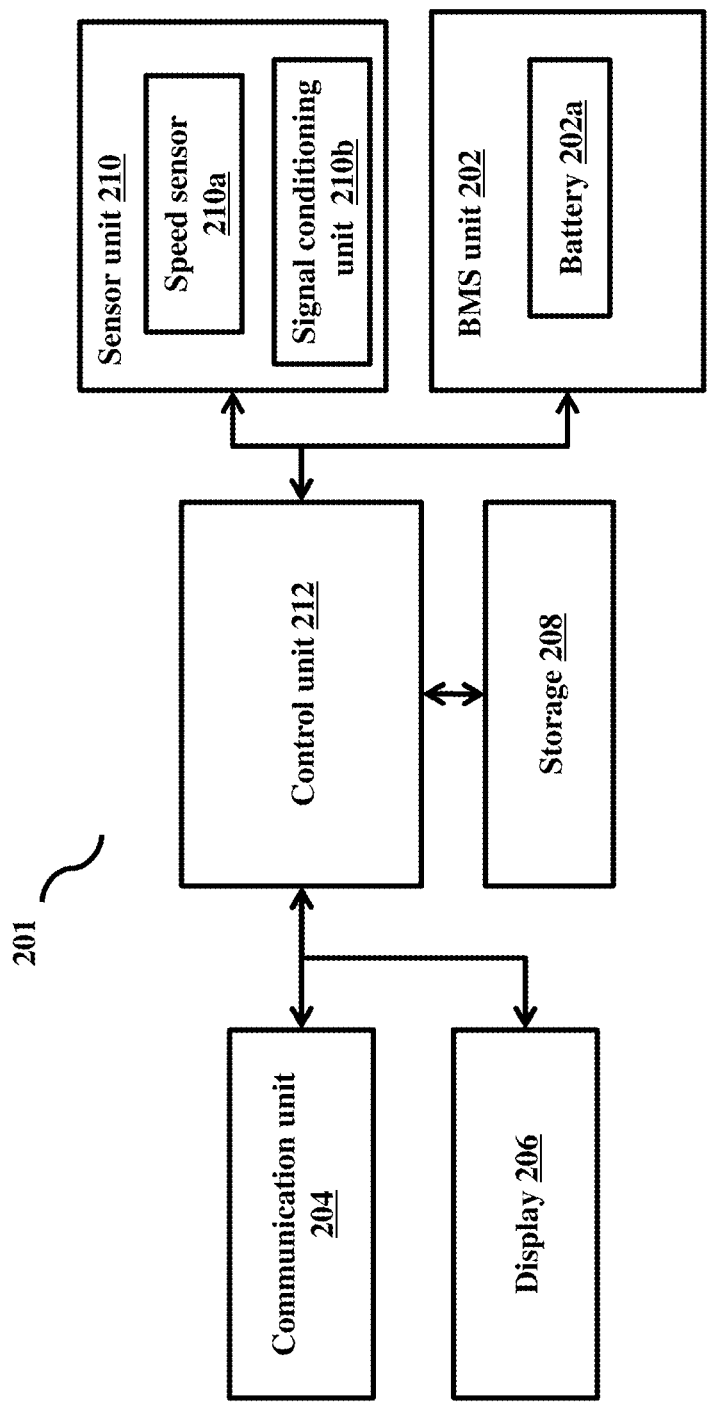

FIGS. 2a-2c depict a control system 201 for controlling power supply of agricultural implement(s) 200 attached to an agricultural vehicle, according to embodiments as disclosed herein. The agricultural vehicle herein refers to any vehicle/farm machinery that can be used for performing at least one agricultural related operation. An example of the agricultural vehicle can be, but not limited to, a tractor, a thresher, a harvester, a combiner, and so on. Embodiments herein are further explained considering the tractor as an example of the agricultural vehicle, but it may be obvious to a person of ordinary skill in the art that any suitable vehicle can be considered.

The agricultural vehicle can be capable of pulling, operating, and transporting one or more agricultural implements 200 connected thereto. Examples of the agricultural implement 200 can be, but not limited to, rotavators, sprayers, harrows, plows, planters, harvesters/reapers, fertilizer spreader, sprayers, dispersers, and so on. In an embodiment, the agricultural implement 200 can be connected to the agricultural vehicle using a detachable means, such as a three-point hitch/linkage, and so on. In an embodiment, the agricultural implement 200 can be connected to the agricultural vehicle permanently.

The agricultural implement includes the control system 201, which can be mounted on the agricultural implement 200 at a suitable position. The control system 201 can be configured to manage operations of the agricultural implement 200. In an embodiment, the control system 201 can be configured to control the power supplied to the agricultural implement 200. As illustrated in FIG. 2a, the control system 201 includes a Battery Management System (BMS) unit 202, a communication unit 204, a display unit 206, a storage 208, a sensor unit 210, and a control unit 212. The control unit 212 can be communicatively coupled with the BMS unit 202, the communication unit 204, the display unit 206, the sensor unit 210, and the storage 208 using at least one of the Internet, a wired network (a Local Area Network (LAN), a Controller Area Network (CAN) network, a Universal Asynchronous Receiver/Transmitter (UART), a bus network, Ethernet and so on), a wireless network (a Wi-Fi network, a cellular network, a Wi-Fi Hotspot, Bluetooth, Zigbee and so on) and so on.

The BMS unit 202 can be configured to power up components 204-212 of the control system 201 by providing power supply to the components 204-212. In an embodiment, the BMS unit 202 can provide power supply to the components 204-210 of the control system 201 under a control of the control unit 212.

As illustrated in FIG. 2b, the BMS unit 202 includes at least one standalone battery 202a. In an embodiment, the at least one battery 202a can be a rechargeable battery 202a. The at least one battery 202a can be configured to provide the power supply to the components 204-212 of the control system 201 of the agricultural implement. The at least one battery 202a can be associated with at least one charging port/module 202b, that can be used to connect with an external adapter/charger to recharge the at least one battery 202a. The usage of the at least one standalone rechargeable battery 202a in the agricultural implement eliminates a need for the agricultural implement 200 to derive the power supply from the agricultural vehicle.

The communication unit 204 can be configured to enable the control system 201 to connect with at least one external entity (such as an external server, a user/operator device (device used by an operator of the agricultural implement), and so on. In an embodiment, the communication unit 204 can enable the control system 201 to connect with the at least one external entity using at least one of a Wireless Local Area Network (WLAN), Wireless Fidelity (Wi-Fi), Wi-Fi Direct, Bluetooth, Bluetooth Low Energy (BLE), cellular communications (2G/3G/4G/5G or the like), and so on. In an embodiment, the communication unit 204 may include physical ports that enable the control system 201 to connect with additional devices/modules. Examples of the physical ports can be, but not limited to, general-purpose input/output (GPIO), Universal Serial Bus (USB), Ethernet, Display Serial Interface (DSI), and so on. Examples of the additional devices/modules can be, but not limited to, a CAN bus, On-board diagnostics (OBD) ports, the sensor unit 210, and so on.

The display unit 206 can be configured to enable the operator of the agricultural implement 200 to interact with the control system 201. The display unit 206 can display status/charging level of the at least one battery 202a to the operator. The display unit 206 can also display various parameters (such as speed, load, and so on) of the agricultural implement 200 that are measured by the control unit 212 to the operator. The display unit 206 can also display alerts/warnings generated by the control unit 212 to the operator to operate the agricultural implement 200 in an optimized speed. The alerts/warnings can be in the form of at least one of a visual alert/warning (provided using the display or any other suitable means such as a light) or an audio alert/warning (provided using a speaker, headphones, earphones, and so on). The alerts/warnings can be also provided to another device (which may be present remotely), such as a mobile phone, smart phone, computer, server, and so on.

The sensor unit 210 can be configured to measure the speed of the agricultural implement 200. As illustrated in FIG. 2b, the sensor unit 210 includes at least one speed sensor 210a for measuring the speed of the agricultural implement 200. The speed can be measured with respect to the rotation of the agricultural implement 200. The speed sensor 210a can be mounted on the agricultural implement 200 at suitable position. In an embodiment, the speed sensor 210a can be an hour counter. In an embodiment, the speed sensor 210a can be, but not limited to, a magnetic type speed sensor, a proximity type speed sensor, a contact-type sensor, a non-contact type sensor and so on. In an embodiment, the speed sensor 210a can be a Hall Effect sensor. However, it is also within the scope of the embodiments disclosed herein to provide any type of speed sensor without otherwise deterring the intended function of measuring speed values as can be deduced from this description and corresponding drawings.

The sensor unit 210 can also be configured to measure parameters of the agricultural implement 200 such as, but not limited to, load, hours of usage, speed, time of operation, and so on.

In an embodiment, the speed sensor 210a can be configured to generate at least one input signal by sensing rotation of the agricultural implement 200. The speed sensor 210a may generate pulse with the signal based on duration and a number of detecting pulses, which can be converted to the speed. The generated at least one input signal can correspond to the speed of the agricultural implement 200. In an example herein, the generated at least one input signal can be a digital signal. The speed sensor 210a can be coupled to a signal-conditioning unit 210b. The signal-conditioning unit 210b can process the at least one input signal generated by the speed sensor 210a using at least modulation technique. The signal-conditioning unit 210b further provides the processed at least one input signal (generated by the speed sensor 210a) to the control unit 212. In an example herein, the signal-conditioning unit 210b can convert the at least one digital input signal generated by the speed sensor 210a into an analog signal using Pulse Width Modulation (PWM).

In an embodiment, the speed sensor 210a can be used as a voltage generator. The speed sensor 210a can generate the voltage by sensing the rotation/rpm of the agricultural implement 200. The speed sensor 210a includes a magneto system for generating the voltage/charge (as disclosed in Indian patent application No. 201941008765 ("Methods and apparatus for integrated sensing and self-charging in farm implements")). In an embodiment, the voltage generated by the speed sensor 210a based on the rotation of the agricultural implement 200 can be used to power up the control unit 212. In an embodiment, the voltage generated by the speed sensor 210a can be used to power up the components (the communication unit 204, the display 206, the storage 208, and the control unit 212) of the control system 201. In an embodiment, the voltage generated by the speed sensor 210a can be used to charge the at least one battery 202a of the BMS unit 202. Thereby, a need for a charging port requirement on the control system 201 and a need for a battery replacement requirement can be eliminated. Due to the elimination of such needs, the control system 201 (as illustrated in FIG. 2c) can be completely sealed. The completely sealed control system 201 can be dust proof, leak proof, water proof and able to withstand dry land and wet land cultivation and vibration as per the farm requirements. In addition, the control system 201 (as illustrated in FIG. 2c) may have zero maintenance as the control system 201 is completely sealed and does not require any replacement of the at least one battery 202.

The control unit 212 can include at least one of a single processer, a plurality of processors, multiple homogeneous or heterogeneous cores, multiple CPUs of different kinds, a microcontroller, and other accelerators. Further, the plurality of processing units may be located on a single chip or over multiple chips. The control unit 212 also includes components such as, but not limited to, Input/Output (I/O) ports, a memory, a storage unit, and so on. The control unit 212 can be configured to measure the various parameters of the agricultural implement 200 using the sensor unit 210 and accordingly provides the warning/alerts to the operator to operate the agricultural implement 200 in the optimized speed.

In an embodiment, the control unit 212 can be configured to control the power supply to the components (the communication unit 204, the display 206, the sensor unit 210, and the memory 208) of the control system 201, thereby saving energy of the at least one battery 202a of the BMS unit 202. The control unit 212 may decide to power up the components of the control system 201 based on a mode of the agricultural implement, thereby saving energy of the at least one battery 202a. The mode can be an idle mode, in which the agricultural implement does not operate. The mode can be an operative mode, in which the agricultural implement operates/starts rotates.

In an embodiment, the control unit 212 can alone be powered up/turned ON to operate in the idle mode of the agricultural implement 200. During the idle mode, the control unit 212 can decide to only turn ON the speed sensor 210a of the sensor unit 210 for a first pre-determined time (for example; 'X' milliseconds (ms)). When the control unit 212 decides to turn ON the speed sensor 210a, the control unit 212 provides instructions to the BMS unit 202 to provide required amount of power supply to the speed sensor 210a. In an embodiment, the amount of power supply/current can be pre-determined/fixed, however, calibration may be used to fix the amount of power supply. In an embodiment, the amount of power supply can be varied based on requirements for charging the other components, however the amount of current may be fixed charge only. When the sensor unit 210 is turned ON for 'X' ms (hereinafter referred as a turn ON period) during the idle mode, the control unit 212 checks for the signal from the speed sensor 210a based on the rotation of the agricultural implement 200. On receiving the signal from the speed sensor 210a during the turn ON period, the control unit 212 determines that the agricultural implement 200 has entered into the operative mode.

Once the signal from the speed sensor 210a is received, the control unit 212 decides to turn ON all other components (the communication unit 204, the display 206, and the storage 208) of the control system 201. When the control unit 212 decides to turn ON one or more of the components 204-208, the control unit 212 instructs the BMS unit 202 to provide the power supply to one or more of the components 204-208. If the control unit 212 does not receive any signal from the speed sensor 210 during the turn ON period, the control unit 212 does not turn ON all other components 204-208 of the control system 201. Thus, all other components of the control system 201 can be in a sleep state/turned OFF state during the idle mode.

After an expiry of the turn ON period without receiving any signal from the speed sensor 210a, the control unit 212 decides to turn OFF the speed sensor 210a for a second pre-determined time (for example: 'Y' ms (hereinafter referred as a turn OFF period)) during the idle mode. During the turn OFF period of the speed sensor 210a, the control unit 212 turns OFF all other components of the control system 201. Thus, during the idle mode of the agricultural implement 200, power consumption from the at least one battery may be reduced, which increases the battery life.

In an embodiment, the turn ON period and the turn OFF period may be decided based on requirements to save the energy of the battery 202a. Also, the turn ON period and turn OFF period may be varied based on a change in requirements to save the energy of the battery 202a. For example, if the requirement is changed to save more energy of the battery 202a, then the turn ON period and turn OFF may be set accordingly.

In an example herein, the control unit 212 decides the turn ON period for speed sensor 210a to turn ON based on the requirement to save the energy of the battery 202a, wherein the turn ON period may be decided for few msec. During the turn ON period, the control unit 212 sends a signal to the speed sensor 210a to determine any rotation of the agricultural implement. Further, the at least one other component (for example, consider the other component may be the communication module/Bluetooth 204) may be in the sleep/default OFF mode. The speed sensor 210a may obtain the signal in a frequent amount of time from the control unit 212 to determine the speed variations based on the rotations of the agricultural implement. On determining the rotations/speed variations, the control unit 212 may power up the Bluetooth 204 using the power supply from the battery 202a, thereby makes huge energy saving in Bluetooth 204 to be in a broadcast mode in default. Otherwise, the control unit 212 decides to operate the Bluetooth 204 in the sleep mode. The control unit 212 further sends a successive signal after a gap of sec, wherein the gap between the few msec and sec may be effective. The successive signal may be for the speed sensor 212a to turn off for few sec.

In an embodiment, when the speed sensor 210 is the voltage generator, the components 202-208 of the control system 201 may not be powered up during the idle mode including the control unit 212. Thus, the entire control system 201 may be in the sleep state. When the agricultural implement enters into the operative mode/starts rotating, the speed sensor 210a generates the voltage by sensing the rotation of the agricultural implement 200. The generated voltage corresponds to the speed of the agricultural implement 200, which is indicating the operative mode of the agricultural implement 200. The generated voltage can be used to turn ON/power up the control unit 212. Thus, the control unit 212 can be turned ON only during the operative mode of the agricultural implement 200. When the control unit 212 turns ON, the control unit 212 decides to turn ON all other components 204-208 of the control system 201 using at least one of the voltage generated by the speed sensor 210a and the power supply of the at least one battery. Thus, reducing the power consumption.

The storage 212 can store at least one of the measured parameters of the agricultural implement 200, inputs collected from the sensor unit 210, the pre-determined turn ON period and the pre-determined turn OFF period, and so on. The storage 212 includes at least one of a file server, a data server, a memory, a server, a cloud and so on. The memory may include one or more computer-readable storage media. The memory may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In some examples, the memory can be configured to store larger amounts of information than the memory. In certain examples, a non-transitory storage medium may store data that can, over time, change (e.g., in Random Access Memory (RAM) or cache).

FIGS. 2a-2c show exemplary blocks of the control system 201, but it is to be understood that other embodiments are not limited thereon. In other embodiments, the control system 201 may include less or more number of blocks. Further, the labels or names of the blocks are used only for illustrative purpose and does not limit the scope of the embodiments herein. One or more blocks can be combined together to perform same or substantially similar function in the control system 201.

Figure 3:
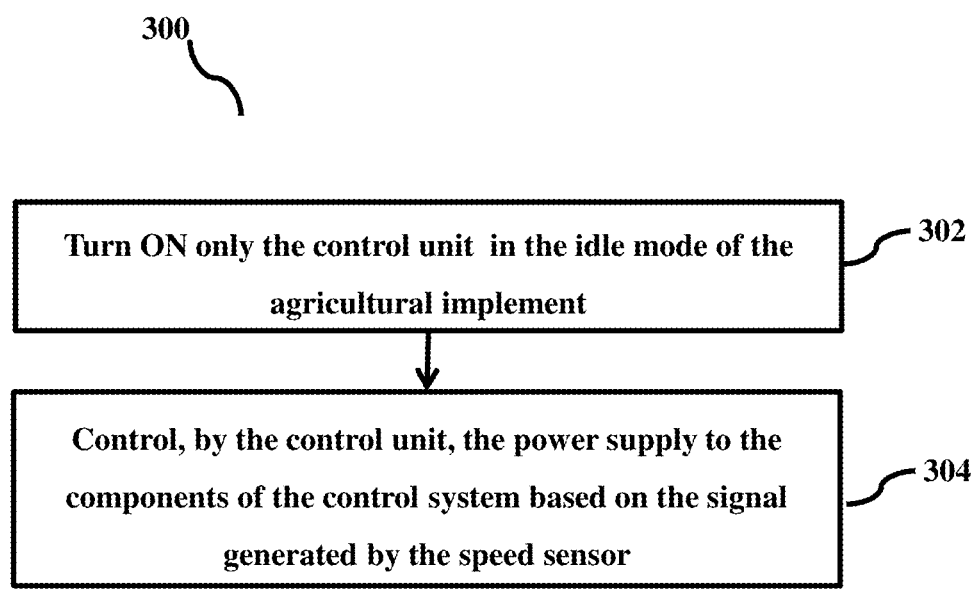
FIG. 3 is an example flowchart depicting a method for controlling power supply of the control system of the agricultural implement, according to embodiments as disclosed herein.

FIG. 3 is an example flowchart 300 depicting a method for controlling power supply of the control system 201, according to embodiments as disclosed herein.

At step 302, the method includes, turning ON only the control unit 212 in the idle mode of the agricultural implement 200 by providing the power supply to the control unit 212 from the at least one battery 202a. At step 304, the method includes controlling, by the control unit 212, the power supply to the components 204-208 of the control unit 212 based on the signal generated by the speed sensor 210a. The control unit 212 turns ON the speed sensor 210a for the pre-determined turn ON period and turns OFF the speed sensor 210a for the pre-determined turn OFF period (a turn ON and turn OFF logic) during the idle mode of the agricultural implement 200. Based on the signal received from the speed sensor 210a during the turn ON period, the control unit 212 decides to turn ON the other components 204-208 of the control system 201 by providing the power supply. Thus, an average power consumption from the at least one battery 202a may be very less during the idle mode of the agricultural implement 200, as the components (excluding the control unit 212) are in the sleep state/turned OFF during the idle mode. The various actions in method 300 may be performed in the order presented, in a different order or simultaneously. Further, in some embodiments, some actions listed in FIG. 3 may be omitted.

Figure 4:
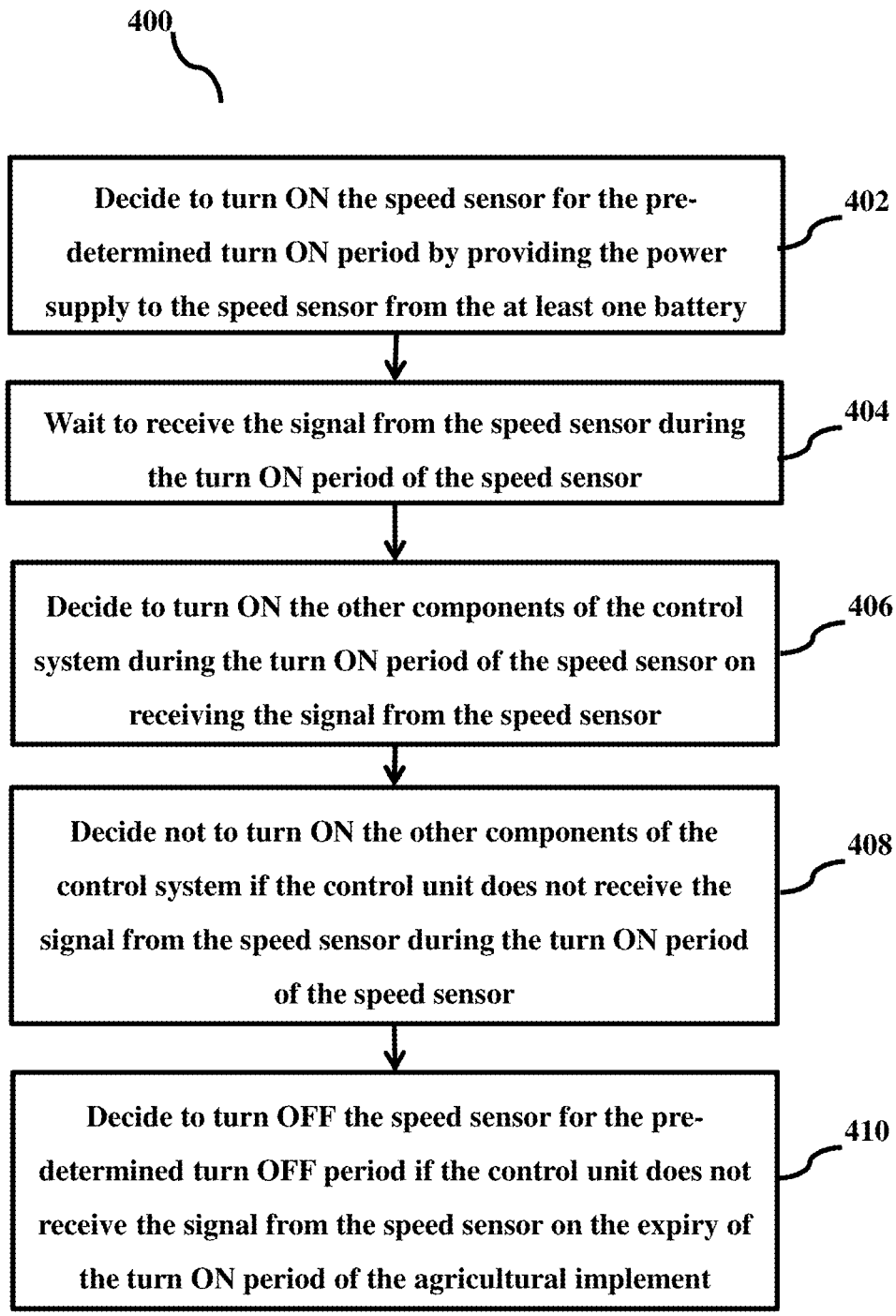
FIG. 4 is an example flowchart depicting control logic of a control unit for operating components of the control system, according to embodiments as disclosed herein.

FIG. 4 is an example flowchart 400 depicting control logic of the control unit 212 for operating the components 204-208 of the control system 201, according to embodiments as disclosed herein. At step 402, the method includes deciding by the control unit 212 to turn ON the speed sensor for the pre-determined turn ON period by providing the power supply to the speed sensor from the at least one battery 202a. The speed sensor can be turned ON, on sensing the rotation of the agricultural implement, which indicates the operative mode of the agricultural implement. At step 404, the method includes waiting by the control unit 212 to receive the signal from the speed sensor 210a during the turn ON period of the speed sensor 210a. The signal can be generated by speed sensor 210a on sensing the rotation of the agricultural implement.

At step 406, the method includes the control unit 212 turning ON the other components 204-208 of the control system 201 during the turn ON period of the speed sensor 210a, on receiving the signal from the speed sensor 210a. The control unit 212 may instruct the BMS unit 202 to provide the power supply to the other components 204-208 of the control system 201. At step 408, the method includes the control unit 212 not turning ON the other components of the control system 201, if the control unit 212 does not receive the signal from the speed sensor 210a during the turn ON period of the speed sensor 210a.

At step 410, the method includes the control unit 212 turning OFF the speed sensor 210a for the pre-determined turn OFF period, if the control unit 212 does not receive the signal from the speed sensor 210a on the expiry of the turn ON period of the agricultural implement 200. Thus, power consumption from the at least one battery 202a may be reduced. The various actions in method 400 may be performed in the order presented, in a different order or simultaneously. Further, in some embodiments, some actions listed in FIG. 4 may be omitted.

Figure 5:
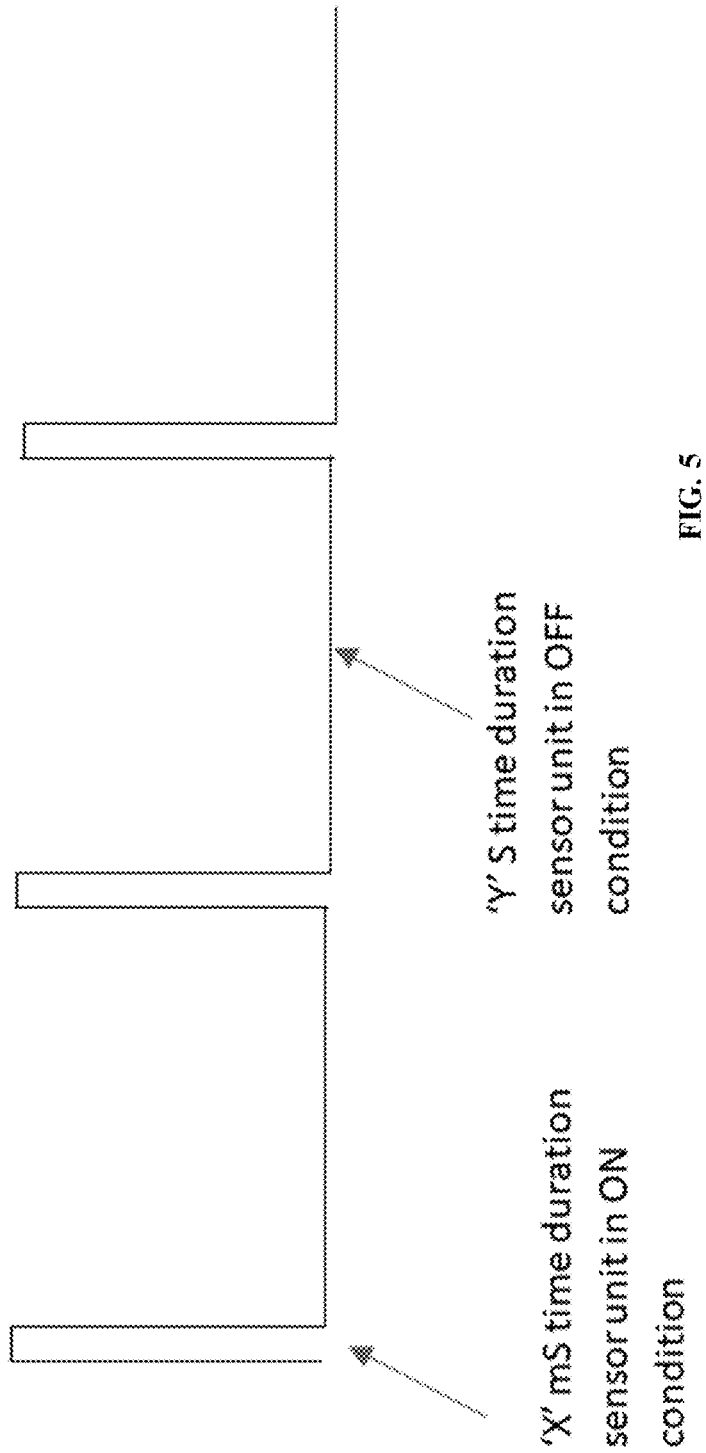
FIG. 5 is an example timing diagram depicting control logic of the control unit, according to embodiments as disclosed herein.

FIG. 5 is an example timing diagram depicting control logic of the control unit 212, according to embodiments as disclosed herein. The control unit 212 alone can be turned ON/powered up during the idle mode of the agricultural implement. The control unit 212 turns ON the speed sensor 210*a* for the pre-determined turn ON period by providing the power supply to the speed sensor 210*a*. In an example herein, the turn ON period 'X' may be pre-determined as 100 ms using a clock. During the turn ON period of the speed sensor, the control unit 212 turns ON the other components 204-208 of the control system 201 if the control unit 212 receives the signal from the speed sensor based on the rotation/operative mode of the agricultural implement.

The control unit 212 further turns OFF the speed sensor 210*a* for the pre-determined turn OFF period if the control unit 212 does not receive the signal from the speed sensor 210*a* on the expiry of the speed sensor 210*a*. In an example herein, the pre-determined turn OFF period may be 2 sec. During the turn OFF period of the speed sensor 210*a*, the control unit 212 does not turn ON the other components of the control unit 212. Thus, the turn ON and turn OFF logic of the control unit 212 may save a huge amount of the battery energy.

Figure 6:
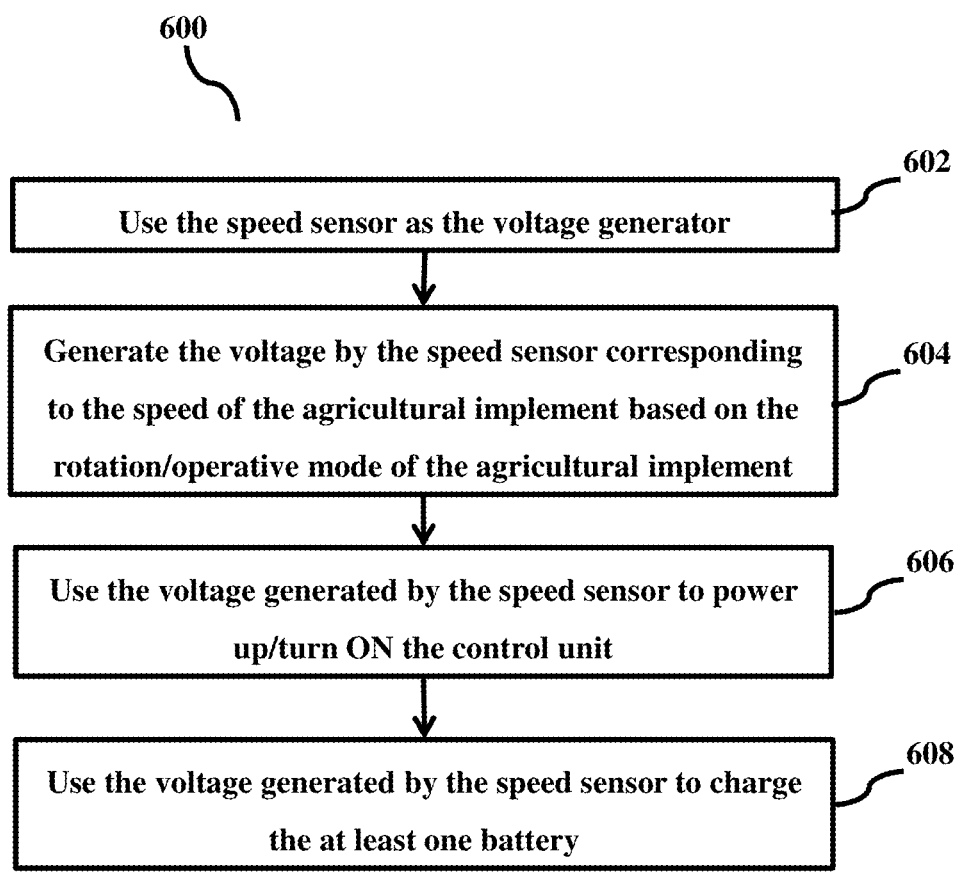
FIG. 6 is an example flowchart depicting a method for operating the control unit, according to embodiments as disclosed herein.

FIG. 6 is an example flowchart 600 depicting a method for operating the control unit 212, according to embodiments as disclosed herein. At step 602, the method includes using the speed sensor 210*a* as the voltage generator. In such a case, the power consumption from the at least one battery 202*a* can be reduced by not powering up the control unit 212 and the other components 202-208 of the control system 201 during sleep state/idle mode of the agricultural implement 200. At step 604, the method includes generating, by the speed sensor 210*a*, the voltage corresponding to the speed of the agricultural implement 200 based on the rotation/operative mode of the agricultural implement 200. At step 606, the method includes using the voltage generated by the speed sensor 210*a* to power up/turn ON the control unit 212. Therefore, the control unit 212 can be triggered by the speed sensor itself without providing power supply to the speed sensor 210*a*. The control unit 212 may further turn ON the other components 202-208 of the control system 201. Thus, the components 202-212 of the control system 201 can be only turned ON during the operative mode of the agricultural implement 200, which further enhances the battery life. At step 608, the method includes using the voltage generated by the speed sensor 210*a* to charge the at least one battery 202*a*. Thus, a need for the charging port 202*b* on the control system 201 may be eliminated. The various actions in method 600 may be performed in the order presented, in a different order or simultaneously. Further, in some embodiments, some actions listed in FIG. 6 may be omitted.

The embodiments disclosed herein can be implemented through at least one software program running on at least one hardware device and performing network management functions to control the network elements. The network elements shown in FIGS. 2*a*-2*c* include blocks, which can be at least one of a hardware device, or a combination of hardware device and software module.

The embodiments disclosed herein describe methods and systems for controlling power supply of an agricultural implement connected to an agricultural vehicle. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments herein can be practiced with modification within the spirit and scope of the claims as described herein.

We claim:

1. A control system for an agricultural implement, the control system comprising:
   a Battery Management System (BMS) unit including at least one battery;
   a communication unit;
   a display unit;
   a storage;
   a sensor unit including at least one speed sensor, configured to:
      generate at least one signal corresponding to speed of the agricultural implement; and
   a control unit coupled to the sensor unit and the BMS unit, wherein the control unit of the control system is only powered up during an idle mode of the agricultural implement, wherein during the idle mode, the agricultural implement is not operated;
   said control unit configured to:
      power up the at least one speed sensor during the idle mode of the agricultural implement for a turn ON period by providing the power supply to the at least one speed sensor using the at least one battery;
      check for the at least one signal from the at least one speed sensor during the turn ON period; and provide power to at least one of the communication unit, the display unit, and the storage of the control system on receiving the at least one signal from the at least one speed sensor during the turn ON period.

2. The control system as claimed in claim 1, wherein the at least one speed sensor is configured to generate the at least one signal on sensing rotation of the agricultural implement, wherein the generated at least one signal indicates an operative mode of the agricultural implement.

3. The control system as claimed in claim 1, wherein the control unit is configured to:
operate the at least one component of the control system in a sleep state when the control unit does not receive the at least one signal from the at least one speed sensor during the turn ON period of the at least one speed sensor.

4. The control system as claimed in claim 1, wherein the control unit is configured to:
power off the at least one speed sensor for a turn OFF period on an expiry of the turn ON period without receiving the at least one signal from the at least one speed sensor; and
operate the at least one component of the control system in the sleep state during the turn OFF period of the at least one speed sensor.

5. The control system as claimed in claim 1, wherein the at least one speed sensor is used as a voltage generator.

6. The control system as claimed in claim 1, wherein the control unit and the at least one component of the at least one control system is operated in the sleep state during the idle mode of the agricultural implement when the at least one speed sensor is used as the voltage generator.

7. The control system as claimed in claim 1, wherein the at least one speed sensor is configured to:
generate a voltage on sensing the rotation of the agricultural implement, wherein the voltage corresponds to the speed of the agricultural implement indicating the operative mode of the agricultural implement; and
trigger the control unit to power up the at least one component of the control system using at least one of the generated voltage and the battery.

8. The control system as claimed in claim 1, wherein the at least one speed sensor is configured to charge the at least one battery using the generated voltage.

9. The control system as claimed in claim 1, wherein:
the communication unit is configured to enable the control system to connect with at least one external entity;
the display unit is configured to enable an operator of the agricultural implement to interact with the control system; and
the storage is configured to store at least one measured parameter of the agricultural implement, wherein the measured parameter includes the speed of the agricultural implement.

* * * * *